US012114133B2

(12) United States Patent
Guo et al.

(10) Patent No.: US 12,114,133 B2
(45) Date of Patent: Oct. 8, 2024

(54) HEARING DEVICE COMPRISING A FEEDBACK CONTROL SYSTEM

(71) Applicant: Oticon A/S, Smørum (DK)

(72) Inventors: Meng Guo, Smørum (DK); Mojtaba Farmani, Smørum (DK); Anders Meng, Smørum (DK); Thomas Kaulberg, Smørum (DK); Peter Sommer, Smørum (DK)

(73) Assignee: OTICON A/S, Smørum (DK)

( * ) Notice: Subject to any disclaimer, the term of this patent is extended or adjusted under 35 U.S.C. 154(b) by 177 days.

(21) Appl. No.: 17/968,186

(22) Filed: Oct. 18, 2022

(65) Prior Publication Data

US 2023/0121895 A1 Apr. 20, 2023

(30) Foreign Application Priority Data

Oct. 19, 2021 (EP) .................................... 21203433

(51) Int. Cl.
*H04R 25/00* (2006.01)

(52) U.S. Cl.
CPC ......... *H04R 25/453* (2013.01); *H04R 25/305* (2013.01); *H04R 25/505* (2013.01); *H04R 25/603* (2019.05); *H04R 25/604* (2013.01)

(58) Field of Classification Search
CPC .. H04R 25/453; H04R 25/603; H04R 25/305; H04R 25/505; H04R 25/604
See application file for complete search history.

(56) References Cited

U.S. PATENT DOCUMENTS 10,283,106 B1 * 5/2019 Saeidi .............. G10K 11/17881
2014/0146977 A1 * 5/2014 Munk .................. G10K 11/175 381/71.11

(Continued)

OTHER PUBLICATIONS

The extended European Search Report issued in Application No. 21203433.4, dated Apr. 25, 2022.

*Primary Examiner* — Mark Fischer
(74) *Attorney, Agent, or Firm* — Birch, Stewart, Kolasch & Birch, LLP

(57) ABSTRACT

A hearing aid adapted for being worn by a user at or in an ear of the user comprises a) at least one input transducer for converting sound in an environment around the user to at least one electric input signal representing said sound; b) an output transducer for converting a processed output signal provided in dependence of said at least one electric input signal to stimuli perceivable to the user as sound; c) a feedback control system comprising an adaptive filer, the feedback control system being configured to provide an adaptively determined estimate ($\underline{h}^*(n)$) of a current feedback path ($\underline{h}(n)$) from said output transducer to said at least one input transducer in dependence of c1) said at least one electric input signal, c2) said processed output signal, and c3) an adaptive algorithm. The hearing aid further comprises d) a database comprising a multitude (M) of previously determined candidate feedback paths ($\underline{hm}$); and e) a controller configured to identify a change in the current feedback path ($\underline{h}(n)$) based on the adaptively determined estimate ($\underline{h}^*(n)$) of the current feedback path and at least one of said multitude of previously determined candidate feedback paths ($\underline{h}_m$). A method of operating a hearing aid is further disclosed. The invention may e.g. be used in hearing aids, e.g. binaural hearing aid systems or headsets, or speakerphones, or combinations thereof.

20 Claims, 6 Drawing Sheets

(56) References Cited

U.S. PATENT DOCUMENTS

| | | | | |
|---|---|---|---|---|
| 2015/0243271 | A1 | 8/2015 | Goldstein | |
| 2016/0183012 | A1 * | 6/2016 | Pedersen | H04R 25/554 381/318 |
| 2020/0007995 | A1 | 1/2020 | Pedersen et al. | |

* cited by examiner

HEARING DEVICE COMPRISING A FEEDBACK CONTROL SYSTEM

TECHNICAL FIELD

The present disclosure relates to hearing devices, e.g. hearing aids. The present disclosure addresses the well-known acoustic feedback problem in a (miniature, e.g. body-worn) hearing device. More specifically, when adaptive filters are used in a feedback cancellation system, they can be very efficient to cancel/minimize the negative effect of the acoustic feedback. However, when there is a fast change of the acoustic feedback path, it usually takes several hundreds of milliseconds before the adaptive filters have converged to the new feedback path and thereby again being efficient to cancel the feedback and maintain system stability. In the meantime (during these hundreds of milliseconds or longer), the system can be unstable.

SUMMARY

A First Hearing Device (e.g. Hearing Aid):

In an aspect of the present application there is provided a hearing aid adapted for being worn by a user at or in an ear of the user. The hearing aid comprises

- at least one input transducer for converting sound in an environment around the user to at least one electric input signal representing said sound;
- an output transducer for converting a processed output signal provided in dependence of said at least one electric input signal to stimuli perceivable to the user as sound;
- a feedback control system comprising an adaptive filer, the feedback control system being configured
  - to provide an adaptively determined estimate ($\underline{h}^*(n)$) of a current feedback path ($\underline{h}(n)$) from said output transducer to said at least one input transducer in dependence of
    - said at least one electric input signal,
    - said processed output signal, and
    - an adaptive algorithm.

The hearing aid may further comprise,

- a database comprising a multitude (M) of previously determined candidate feedback paths ($\underline{h}_m$); and
- a controller configured to identify a change in the current feedback path ($\underline{h}(n)$) based on the adaptively determined estimate ($\underline{h}^*(n)$) of the current feedback path and at least one of said multitude of previously determined candidate feedback paths ($\underline{h}_m$).

Thereby a hearing aid with an improved feedback control may be provided.

A second hearing device (e.g. hearing aid):

In an aspect of the present application there is provided a hearing aid adapted for being worn by a user at or in an ear of the user. The hearing aid comprises

- at least one input transducer for converting sound in an environment around the user to at least one electric input signal representing said sound;
- an output transducer for converting a processed output signal provided in dependence of said at least one electric input signal to stimuli perceivable to the user as sound;
- a feedback control system comprising an adaptive filer, the feedback control system being configured
  - to provide an adaptively determined estimate ($\underline{h}^*(n)$) of a current feedback path from said output transducer to said at least one input transducer in dependence of
    - said at least one electric input signal,
    - said processed output signal, and
    - an adaptive algorithm; and
  - to provide a current feedback corrected version of said at least one electric input signal, termed the current feedback corrected signal (e(n)).

The hearing aid may further comprise

- a database comprising a multitude of previously determined candidate feedback paths ($\underline{h}_m$); and
- a controller configured to provide an updated estimate of said current feedback path in dependence ($\underline{h}_{upd}(n)$) of said adaptively determined estimate of said current feedback path and at least one of said multitude of previously determined candidate feedback paths ($\underline{h}_m$);
- wherein the feedback control system, at least in a specific feedback control mode of operation, is configured to provide said current feedback corrected version of the at least one electric input signal in dependence of said updated estimate of said current feedback path.

Thereby a hearing aid with an improved feedback control may be provided.

The hearing aid may comprise an adaptive filter comprising the adaptive algorithm. The adaptive filter may be configured to adaptively determine the estimate ($\underline{h}^*(n)$) of the current feedback path from the output transducer to the at least one input transducer.

Further Features of the First or Second Hearing Aid:

The hearing aid may comprise an adaptive filter comprising the adaptive algorithm. The adaptive filter may be configured to adaptively determine the estimate ($\underline{h}^*(n)$) of the current feedback path from the output transducer to the at least one input transducer. The multitude (M) of previously determined candidate feedback paths ($\underline{h}_m$) may comprise any number appropriate for a given application, m=1, . . . , M. In a hearing aid application (having limited processing capacity and where processing time (latency) generally should be minimized), the number of previously determined candidate feedback paths ($\underline{h}_m$) may e.g. be larger or equal to two, and smaller or equal to ten. The term 'current' is indicate by time index 'n', e.g. $\underline{h}^*(n)$ for the adaptively determined estimate ($\underline{h}^*(n)$) of the current feedback path. The 'real' current feedback path is denoted $\underline{h}(n)$. The previously determined candidate feedback paths (typically stored in memory of the hearing aid) are denoted $\underline{h}_m$, m=1, . . . , M, without a time index 'n' to indicate their time invariance. It should be noted, though, that an update or addition of new 'previously determined' feedback paths (e.g. during use of the hearing aid) is not thereby intended to be excluded. At least some (e.g. all) of the previously determined candidate feedback paths may be estimated offline, e.g. with a feedback path analyzer (FPA) of a hearing aid fitting system e.g. implemented as an APP (e.g. of a smart phone). One or more candidate feedback paths may be estimated during use of the hearing aid, e.g. using an APP.

The controller may be configured to—if a change in the current feedback path ($\underline{h}(n)$) has been identified—determine whether the adaptively determined estimate ($\underline{h}^*(n)$) of the current feedback path converges towards at least one of said multitude of previously determined candidate feedback paths ($\underline{h}_m$). The controller may be configured to determine whether the adaptively determined estimate ($\underline{h}^*(n)$) of the current feedback path converges towards one of said multitude of previously determined candidate feedback paths ($\underline{h}_m$).

The controller may be configured to provide an updated estimate of the current feedback path ($\underline{h}_{upd}(n)$) if the change in the current feedback path ($\underline{h}(n)$) has been identified and if the adaptively determined estimate ($\underline{h}$*(n)) of the current feedback path converges towards at least one of the multitude of previously determined candidate feedback paths ($\underline{h}_m$). The system (e.g. the controller) may be configured to react if we observe it is converging to a candidate feedback path, rather than when it has converged (in that case, it is too late, and we don't really benefit from the database feedback paths anymore).

The controller may be configured to provide the updated estimate of the current feedback path ($\underline{h}_{upd}$(n)) in dependence of the adaptively determined estimate of the current feedback path ($\underline{h}$*(n)) and at least one of the multitude of previously determined candidate feedback paths ($\underline{h}_m$).

The hearing aid may comprise an audio signal processor configured to apply one or more processing algorithms to the feedback corrected version of the at least one electric input signal, and to provide the processed signal in dependence thereof.

The controller may be configured to provide the updated estimate of the current feedback path ($\underline{h}_{upd}$(n)) as a linear combination of the adaptively determined estimate of a current feedback path ($\underline{h}$*(n)) and the at least one of the multitude of previously determined candidate feedback paths ($\underline{h}_m$).

The feedback control system may be configured to provide a current feedback corrected version of the at least one electric input signal, termed the current feedback corrected signal (e(n)).

The controller may be configured to provide a candidate current feedback corrected signal ($e_m$(n)) for the at least one of the previously determined candidate feedback paths ($\underline{h}_m$). Each of the database error signals $e_m$(n) (i.e. each of the candidate current feedback corrected signals) may then be compared to the current adaptive filter error signal e(n) (calculated based on the determined estimate of the current feedback path ($\underline{h}$*(n)) and the current at least one electric input signal). The comparison may e.g. be based on the magnitude, or smoothed/filtered magnitude (over time) of the error signals e(n) and $e_m$(n).

The weights of the linear combination may be determined in dependence of a comparison of the candidate current feedback corrected signal ($e_m$(n)) to the current feedback corrected signal (e(n)). The comparison may be a difference (e.g. ($e_m$(n)−e(n)) or |$e_m$(n)−e(n)|). The comparison may be based on the magnitude, or smoothed or filtered magnitude (over time) of the feedback corrected signals (e(n), $e_m$(n)). An individual weight ($a_m$) of a given candidate feedback path ($\underline{h}_m$) of the linear combination may be proportional to a difference between (e.g. a magnitude of said difference) the associated candidate current feedback corrected signal ($e_m$(n)) and the current feedback corrected signal (e(n)). The sum of the weights of the linear combination may be 1. Ideally, we would like $a_0$=0, and $a_m$=1 for the candidate feedback path m (see expression for $\underline{h}_{upd}$(n) below). In practice, however, this would often introduce an audible artifact in the current error signal e(n), and hence in the hearing aid output signal. Therefore, weights $a_0$>0 are used in practice to avoid audible artifacts. However, $a_0$ should be small and close to 0, such as 0.2, 0.1 . . . and $a_m$ should be big, such as 0.8, 0.9 in order to update $\underline{h}_{upd}$(n) quickly enough.

The hearing aid may be configured to band-pass, low-pass, and/or high-pass filter the feedback corrected input signals (e(n), $e_m$(n)) before the comparison of the candidate current feedback corrected signal ($e_m$(n)) to the current feedback corrected signal (e(n)) is performed. An exemplary band-pass filter may have a pass-band, where feedback is most likely to occur (e.g. between 2 kHz and 4 kHz). A low-pass filter may have a cut-off frequency in the range 3 KHz to 5 kHz. A high-pass filter may have a cut-off frequency in the range 1.5 kHz to 3 kHz.

The weights of the linear combination may be determined in dependence a direct comparison of $\underline{h}$*(n) and $\underline{h}_m$.

The feedback control system may, at least in a specific feedback control mode of operation, be configured to provide the current feedback corrected version (e(n)) of the at least one electric input signal in dependence of the updated estimate of the current feedback path ($\underline{h}_{upd}$(n)).

The controller may be configured to control an adaptation rate of the adaptively determined estimate ($\underline{h}$*(n)). The adaptation rate may e.g. be controlled by controlling a step size (or forgetting factor) of the adaptive filter by increasing (or decreasing) a step size (or forgetting factor) of an adaptive algorithm (e.g. an LMS or NLMS or RLS algorithm) used to determine the current feedback path. The step size may e.g. be increased (or decreased) by a factor of 2, 4, 8, 16, etc.

The feedback control system may be configured to enter the control mode of operation in dependence of one or more conditions being fulfilled. The one or more conditions may e.g. comprise that the level of the at least one electric input signal is required to be in a certain range, e.g. corresponding to between 40-60 dB SPL, or 60-80 dB SPL, or >80 dB SPL, or 40-80 dB SPL, and/or that the at least one electric input signal is of specific type (e.g., speech, music, background noise etc.). The hearing aid may comprise a (e.g. at least one) level detector providing an estimate of a level of the at least one electric input signal. The hearing aid may comprise an acoustic environment classifier for characterizing a current acoustic environment around the user, e.g. as a specific type (e.g. speech, music, background noise, speech in noise, etc.).

One of the candidate feedback paths ($\underline{h}_m$) may be estimated to be the most likely feedback path during normal hearing aid operation. The most likely feedback path during normal hearing aid operation may e.g. be determined by prior knowledge, e.g. determined by a long-term averaging of current feedback path estimates (e.g. measured by the hearing aid in use). The most likely feedback path (href) may be used as a reference for a comparison to the current feedback path ($\underline{h}$*(n)). If the current feedback path estimate ($\underline{h}$*(n)) differs (significantly and quickly) from the reference, it indicates a major change, e.g. larger than 1 dB, 2 dB, 3 dB, etc. Such major change may be a condition for entering the (feedback) control mode of operation.

The hearing aid may be configured to update (e.g. one or more of) the candidate feedback paths in the database during operation of the hearing aid.

The hearing aid according may be configured to provide that the candidate feedback paths of the database comprise or are constituted by pre-determined feedback paths.

However, the hearing aid may be configured to provide that the candidate feedback paths of the database are automatically learned and updated over time. The learning and update of the candidate feedback paths of the database may be configured to follow the variations of the current feedback path $\underline{h}$(n) and its previous values over time. This may e.g. be done by monitoring variations in the current feedback estimate (h*(n)) and its previous values over time.

The basic idea of the database update is based on the variations of adaptive filter $\underline{h}$*(n) over time. Whenever the adaptive filter $\underline{h}$*(n) has converged to its steady-state (e.g., in the mean square sense), it is an indication that the underlying acoustic feedback situation $\underline{h}$(n) is static, and $\underline{h}^*(n)$ is a realistic representative of the feedback path $\underline{h}(n)$. The current adaptive filter estimate $\underline{h}^*(n)$ can then be considered as an input to update the database.

Furthermore, a distance measures $\Delta_m$ between the current adaptive filter estimate $\underline{h}^*(n)$ to each existing candidate feedback path $\underline{h}_m$ may be used to determine if the current adaptive filter estimate $\underline{h}^*(n)$ has converged to a new feedback path which is not yet stored in the database. In that case, a new candidate feedback path should be added to the database. Otherwise, based the distance measure $\Delta_m$, the candidate feedback path $\underline{h}_m$ already in the database may be found and updated using $\underline{h}^*(n)$.

A detailed and example usage of the above-mentioned idea is shown below.

Compute the Error Function $\mathscr{E}(n)$:

$$\Delta\underline{h}(n)=\underline{h}^*(n)-\underline{h}^*(n-1)$$

$$\mathscr{E}(n)=\Delta\underline{h}^T(n)\cdot\Delta\underline{h}^T(n)$$

Update the Database:

when $\mathscr{E}(n)<\eta_1$, for all candidate feedback paths $\underline{h}_m$ compute the distance measure $$\Delta\underline{h}_m(n)=\underline{h}_m-\underline{h}^*(n)$$

$$\Delta_m(n)=\Delta\underline{h}_m^T(n)\cdot\Delta\underline{h}_m(n)$$

if all $\Delta_m(n)>\eta_2$:

create the new candidate feedback path $\underline{h}_{M+1}=\underline{h}^*(n)$ else update the existing candidate feedback path $\underline{h}_m$ with the smallest $\Delta_m(n)$ $$\underline{h}_m=\gamma_1\cdot\underline{h}_m+(1-\gamma_1)\cdot\underline{h}^*(n).$$

$\eta_1$ and $\eta_2$ are both threshold values (such as 0.001, 0.01, 0.1, 1 etc.), M is the number of candidate feedback paths in the database, and $\gamma_1$ is a parameter for smoothing in the range of 0 and 1.

A control mechanism for updating the candidate feedback paths of the database may be configured to monitor the current feedback path estimate $\underline{h}^*(n)$, and to apply machine learning algorithms, such as unsupervised learning (for clustering) and reinforcement learning to identify and improve the candidate feedback paths. For the machine learning algorithms, the observations of $\underline{h}^*(n)$ over time (at each time index n, or at every $10^{th}$ of n, or at every $100^{th}$ of n etc.) can be considered as a new vector data entry, and it would be compared to the feedback paths already in the database, and it is then clustered into the database feedback path m which is the most similar to the current observation of $\underline{h}^*(n)$. At the same time, the feedback paths in the database can also be updated based on this latest observation, as described above.

A length of an impulse response of a candidate feedback path ($\underline{h}_m$) may be different, e.g. longer or shorter, than a current length of the adaptive filter used for adaptively determining the estimate ($\underline{h}^*(n)$) of the current feedback path. Thereby a better modelling of desired acoustic situations (represented by the candidate feedback paths ($\underline{h}_m$, m=1, . . . , M) of the database) can be provided. Such a candidate feedback path with long or short impulse response may not be directly used to replace the current feedback path estimate $\underline{h}^*(n)$, but a truncated version or an extended version (with zeros) may be used, and/or it can be used to control the adaptation rate (e.g. the step size or forgetting factor) in the adaptive algorithm.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may be constituted by or comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, e.g. Bluetooth LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 KHz (adapted to the particular needs of the application) to provide digital samples $x_n$ (or x[n]) at discrete points in time $t_n$ (or n), each audio sample representing the value of the acoustic signal at $t_n$ by a predefined number Nb of bits, No being e.g. in the range from 1 to 48 bits, e.g. 24 bits. Each audio sample is hence quantized using Nb bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid. A mode of operation may include a specific (feedback) control mode of operation wherein feedback path estimation according to the present disclosure is activated.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid comprises an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A First Method:

In an aspect, a method of operating a hearing aid adapted for being worn by a user at or in an ear of the user is furthermore provided by the present application. The hearing aid comprises at least one input transducer and an output transducer. The method comprises

- providing by said input transducer at least one electric input signal representing sound in an environment around the user;
- converting by said output transducer a processed output signal provided in dependence of said at least one electric input signal to stimuli perceivable to the user as sound;
- providing by an adaptive algorithm an adaptively determined estimate ($\underline{h}^*(n)$) of a current feedback path ($\underline{h}(n)$) from said output transducer to said at least one input transducer in dependence of
  said at least one electric input signal,
  said processed output signal, and
  said adaptive algorithm; and.

The method further comprises

- providing a multitude of previously determined candidate feedback paths ($\underline{h}_m$); and
- identifying a change in the current feedback path ($\underline{h}(n)$) based on the adaptively determined estimate ($\underline{h}^*(n)$) of the current feedback path and at least one of said multitude of previously determined candidate feedback paths ($\underline{h}_m$).

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Second Method:

In a further aspect, a second method of operating a hearing aid adapted for being worn by a user at or in an ear of the user, the hearing aid comprising at least one input transducer and an output transducer, is furthermore provided by the present application.

The method comprises providing by said input transducer at least one electric input signal representing sound in an environment around the user;

converting by said output transducer a processed output signal provided in dependence of said at least one electric input signal to stimuli perceivable to the user as sound;

providing by an adaptive algorithm an adaptively determined estimate ($\underline{h}^*(n)$) of a current feedback path from said output transducer to said at least one input transducer in dependence of said at least one electric input signal, said processed output signal, and said adaptive algorithm; and providing a current feedback corrected version of said at least one electric input signal, termed the current feedback corrected signal (e(n)).

The method may further comprise providing a multitude of previously determined candidate feedback paths ($\underline{h}_m$); and providing an updated estimate of said current feedback path in dependence ($\underline{h}_{upd}(n)$) of said adaptively determined estimate of said current feedback path and at least one of said multitude of determined candidate feedback paths; and providing, at least in a specific feedback control mode of operation, said current feedback corrected version of the at least one electric input signal in dependence of said updated estimate of said current feedback path.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

It is further intended that the second method can be combined with specific additional features of the first method as described above, in the 'detailed description of embodiments' or in the claims.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The user interface may be configured to allow a user to initiate a measurement session to provide (or update) candidate feedback paths for use in a feedback control system according to the present disclosure to be carried out by the user or 'automatically' by the system guiding the user. The hearing system may be configured to establish a link between the auxiliary device and the hearing device via appropriate antenna and transceiver circuitry in the devices. The link may e.g. be based on Bluetooth (or Bluetooth Low Energy, e.g. Bluetooth LE Audio), or proprietary modifications thereof, or Ultra WideBand (UWB), or other standardized or proprietary wireless communication technologies.

The APP may be generally adapted to control functionality of the hearing device or system, or it may be dedicated to control or influence the feedback control system according to the present disclosure, including to manage measurement (and/or selection for use) of appropriate candidate feedback paths ($\underline{h}_m$) for storage in memory of the hearing device.

The APP my e.g. be adapted to allow the user to activate, or deactivate, one or more predefined candidate feedback paths stored in the memory of the hearing aid.

Further, a configuration of the feedback control system may be performed vi the APP (e.g. to activate or deactivate the feedback control system according to the present disclosure in a given hearing device program).

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular feedback control in hearing aids.

An Overview

Figure 1:
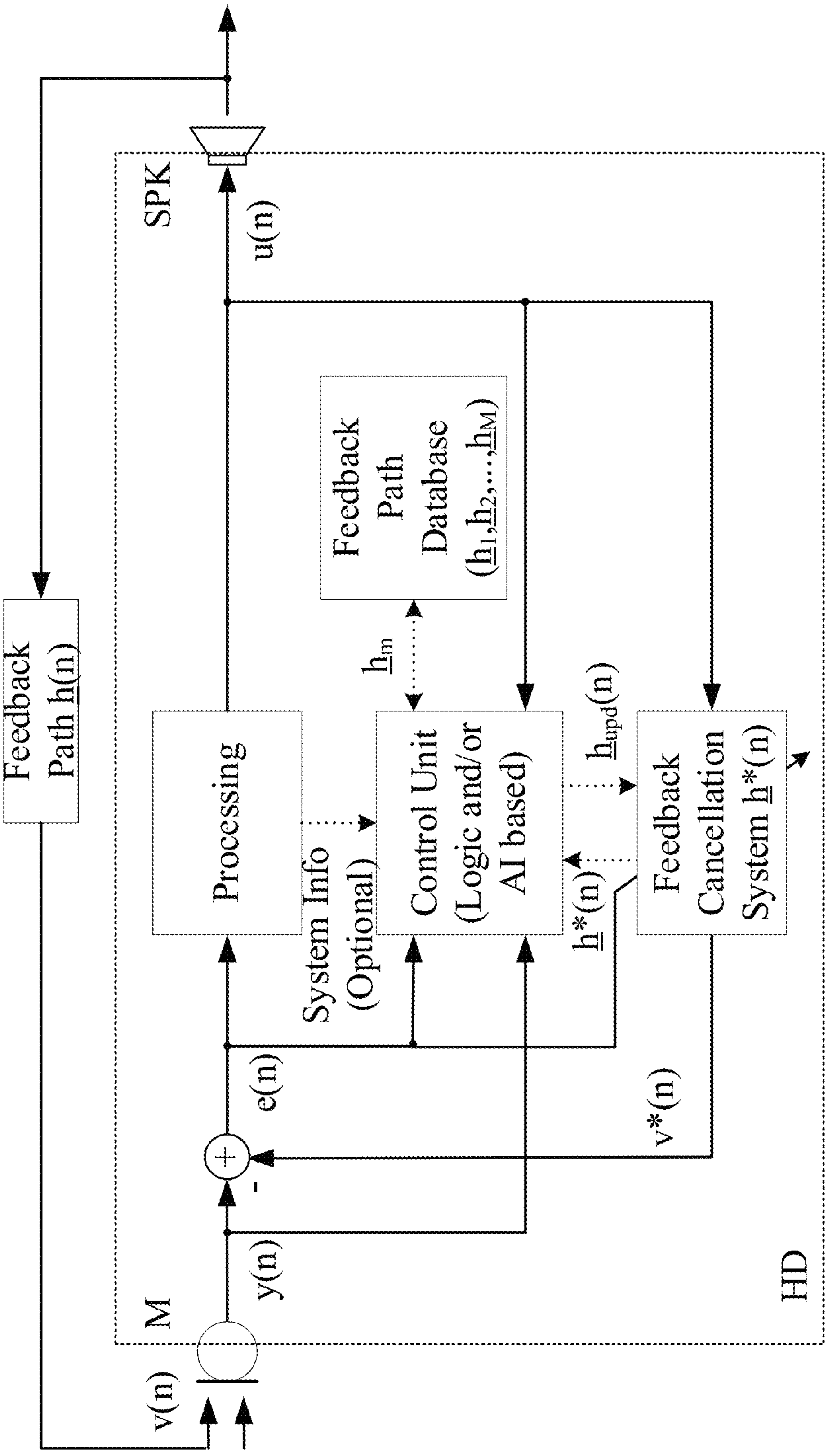
FIG. 1 shows an exemplary block diagram of a hearing aid comprising of a feedback path database and a control unit used to modify a current adaptive filter estimate $\underline{h}^*(n)$ according to the present disclosure.

The present disclosure proposes a method to significantly reduce the time needed for an adaptive filter to converge, after a feedback path change. An overview of the method is shown in FIG. 1. For simplicity, a single-channel feedback cancellation system is shown, but the idea applies to multi-channel feedback cancellation as well.

FIG. 1 shows an exemplary block diagram of a hearing aid comprising of a feedback path database and a control unit used to modify a current adaptive filter estimate $\underline{h}^*(n)$ according to the present disclosure. Solid lines with arrows indicate sound (audio) signals (cf. 'y(n)', 'e(n)', 'u(n)', 'v*(n)'). Dotted lines with small arrows indicate control signals (cf. 'System Info (Optional)', '$\underline{h}_m$', '$\underline{h}^*(n)$', '$\underline{h}_{upd}(n)$').

FIG. 1 illustrates a hearing device (HD. e.g. a hearing aid) adapted for being worn by a user (U). The hearing device (HD) comprises a forward (audio) path and a state of the art feedback control system. The forward path comprises a microphone (M) for providing an electric input signal (y(n)) comprising sound in the environment of the user. The forward path further comprises a processor ('Processing') for processing an input (audio) signal (e(n)). e.g. according to a user's needs, and providing a processed signal (u(n)). The processor may be configured to apply a level and/or frequency dependent gain to a signal of the forward path (here e(n)) and providing a processed output signal (here u(n)) to compensate for the user's hearing impairment. The forward path further comprises an output transducer (SPK, here comprising a loudspeaker) for presenting stimuli perceivable by the user in dependence of the processed signal (u(n)). The forward path may comprise a filter bank allowing signal processing in the forward path to be conducted in the frequency domain. The filter bank may comprise respective analysis (e.g. one for each audio input) and synthesis (e.g. one for each audio output) filter banks. A feedback path from the output transducer to the microphone is indicated by a solid bold arrow ('Feedback Path $\underline{h}$(n)'). The feedback control system comprises an adaptive filter ('Feedback Cancellation System $\underline{h}$*(n)') for estimating a current feedback path ($\underline{h}$(n)) and a sum unit ('+) for subtracting an estimated current feedback path signal $v^*(n)=\underline{h}^*(n)^T\cdot\underline{u}(n)$ (The superscript $^T$ indicates the vector transposition, the signal vector $\underline{u}(n)=[u(n), u(n-1), \ldots, u(n-L+1)]^T$ consists of the processed signal u(n) over time, and L is the length of the adaptive filter estimate $\underline{h}$*(n)), from the electric input signal y(n) from the microphone (where v(n) represents the true feedback path signal received by the microphone (M) as formed by the filtering by the current feedback path ($\underline{h}$(n)) of the current output (u(n)) from the loudspeaker of the hearing aid). Thereby the feedback corrected electric input signal (e(n)) is provided. The (state of the art) adaptive filter provides the current estimate of the feedback path ($\underline{h}$*(n)) by minimizing (using an adaptive algorithm. e.g. LMS or NLMS) the mean square error of a signal, here the feedback corrected electric input signal (e(n) while receiving a reference signal (here the processed signal (u(n)).

A difference from the state of the art system and a fundamental part of a method or device according to the present disclosure is a database ('Feedback Path Database ($\underline{h}_1$, $\underline{h}_2$, . . . , $\underline{h}_m$)'), which comprises several candidate feedback paths $\underline{h}_m$, where m=1, 2, . . . , M. In principle, there is no limitation on the number of candidate feedback paths M. It may, however, be a small number, e.g. 2-5 in practice. These feedback paths can be acquired off-line and/or updated online.

A further difference is the block 'Control Unit (Logic and/or AI based)' connected to the database of candidate feedback paths $\underline{h}_m$, to the processor (Processing), and to the adaptive filter ('Feedback Cancellation System $\underline{h}$*(n)') of the feedback control system. The control unit further receives inputs from the forward (audio) path, here in the form of the electric input signal (v(n)), the feedback corrected electric input signal (e(n)), and the processed signal (u(n)) (which here is also the output signal from which stimuli are generated for presentation to the user, in FIG. 1 via a loudspeaker (SPK)). The control unit may e.g. receive an input from the processor ('System Info (Optional)'), e.g. to indicate a risk of feedback, or a mode control input, or other information of relevance for the feedback control system. The control unit is connected to the database storing current versions of candidate feedback paths ($\underline{h}_m$). The control unit is configured to read current versions of candidate feedback paths ($\underline{h}_m$) and optionally to write new candidate feedback paths or to substitute currently stored versions (e.g. via an APP, cf., e.g. FIG. 4). The control unit receives the current estimate of the feedback path ($\underline{h}$*(n)) from the adaptive filter and, subject to an optional criterion or in a specific feedback control mode of operation, to determine an update current feedback path ($\underline{h}_{upd}$(n)) in dependence of the current estimate of the feedback path ($\underline{h}$*(n)) and one or more of the candidate feedback paths ($\underline{h}_m$) stored in the database. In case an updated current feedback path ($\underline{h}_{upd}$(n)) is determined, it is forwarded to the adaptive filter and used as the current feedback path ($\underline{h}$*(n)) to determine the estimated current feedback path signal ($v^*(n)=\underline{h}^*(n)^T\cdot\underline{u}(n)$). The function of the control unit is further described below and exemplified in FIG. 5.

The candidate feedback paths should, in the best way, represent impulse responses of the true feedback path $\underline{h}$(n), in different feedback situations, e.g., in normal situations without obstacles close to the ear/hearing aid, a phone situation where a phone is placed next to the ear/hearing aid, a hat/helmet situation where the user is wearing a hat/helmet, or a hard-surface situation where the user is getting very close (~10-15 cm) to a wall with hard surface (acoustically reflecting).

A feedback path '$\underline{h}$' may be described by its impulse response and e.g. defined by a number (L) of coefficients, where l=0, 1, . . . , L−1 is a coefficient index of the feedback path in question. The feedback path may be denoted by h or $\underline{h}$. The vector expression ($\underline{h}$) indicates that the feedback path is represented by coefficients h(l), where l=0, 1, . . . , L−1, are the filter coefficients, e.g. $\underline{h}$=[h(0), h(1), . . . , h(L−1)]. The feedback paths (h) dealt with in the present disclosure may be time variant ($\underline{h}$(n), $\underline{h}$*(n), $\underline{h}_{upd}$(n), or time invariant ($\underline{h}_m$). For a given time index (n), a time variant feedback path may be represented by time variant coefficients, e.g. in that $\underline{h}$(n)=[h(n,0), h(n,1), . . . , h(n,L−1)]. A feedback path $\underline{h}$(n) may (alternatively) be described in the frequency domain as a frequency response (H(ω,n), where ω denotes the angular frequency).

Control Unit

During run-time of the hearing aid, each candidate feedback path $\underline{h}_m$ is used to compute a corresponding database error signal $e_m(n)$ based on the hearing aid output signal u(n), in the control unit, as $$e_m(n)=y(n)-\Sigma_l h_m(l)\cdot u(n-l),$$

where y(n) is the microphone signal, n is a time index, and l=0, 1, . . . , L−1 is the coefficient index of the candidate feedback path $\underline{h}_m$ with L coefficients. These coefficients ($\underline{h}_m$(l)) represent the impulse response of the candidate feedback path m, or alternatively some selected coefficients of the candidate feedback path m (which are typically the most representative coefficients for that particular candidate feedback path and most different to other candidate feedback paths). Each of the database error signals $e_m(n)$ is then compared to the current adaptive filter error signal e(n). The comparison is e.g. based on the magnitude, or smoothed/filtered magnitude (over time) of the error signals e(n) and $e_m(n)$.

The signals of the forward path (e.g. y(n), e(n), u(n)) and/or the electric feedback path may be time domain signals or frequency sub-band signals (by applying one or more analysis filter banks, as appropriate).

The control unit, which e.g. may be based on predefined logic or artificial intelligence (AI) based learnings, may decide if the current adaptive filter estimate $\underline{h}$*(n) is performing optimally, or if one (or more) of the candidate feedback paths $\underline{h}_m$ from the database fits better to the current feedback situation and can be used to modify the current estimate of the feedback path $\underline{h}$*(n).

This can be the case, e.g., if the (smoothed/filtered) magnitude of one (or more) of the database error signals $e_m(n)$ is (are) much smaller than the magnitude of the error signal e(n). The control unit can then make a modification of the adaptive filter estimate, based on a linear combination of the current $\underline{h}^*(n)$, and all the candidate feedback paths $\underline{h}_m$ in the database, as $$\underline{h}_{upd}(n)=a_0\cdot\underline{h}^*(n)+\Sigma_m a_m\cdot\underline{h}_m,$$

where $a_0$ and $a_m(a_1, a_2, \ldots, a_M)$ are weights in the range of 0 and 1: furthermore, $a_0+a_1+\ldots+a_M=1$. Furthermore, $a_0$ and $a_m$ $(a_1, a_2, \ldots, a_M)$ can vary over time.

This database approach is realistic, although the candidate feedback paths $\underline{h}_m$ in the database might not fully represent the current acoustic feedback path $\underline{h}(n)$, it can still be a much better match to $\underline{h}(n)$ compared to the current adaptive filter estimate $\underline{h}^*(n)$, especially right after a feedback path change.

In a situation where the user places a phone next to his/her ear, the magnitude of the feedback path $\underline{h}(n)$ can change almost instantly by more than 15 dB (cf. e.g. [1]), hence the current feedback path estimate $\underline{h}^*(n)$ will be more than 15 dB off compared to the current $\underline{h}(n)$. However, if there was a candidate feedback path $\underline{h}_m$ in the database, where $\underline{h}_m$ is e.g. obtained based on previous measurements in the acoustic situation with a phone placed next to this user's ear, $\underline{h}_m$ can be much closer to $\underline{h}(n)$, and very likely only within a few dBs (cf. e.g. [2]).

An example way to control the adaptive estimation is shown below.

Determine feedback path change based on $e_m(n)$ and $e(n)$ smooth the error signals $e_m(n)$ and $e(n)$ over time $$\overline{e}(n)=\gamma_2\cdot\overline{e}(n)+(1-\gamma_2)\cdot\underline{e}^2(n)$$

$$\overline{e}_m(n)=\gamma_2\cdot\overline{e}_m(n)+(1-\gamma_2)\cdot\underline{e}_m^{\,2}(n)$$

if $\max(\overline{e}(n)-e_m(n))>\eta_3$, for all m, a change occurred in $\underline{h}^*(n)$, then to apply larger step size for the adaptive algorithm and/or $\underline{h}_{upd}(n)=a_0\cdot\underline{h}^*(n)+a_k\cdot h_k$, where $\overline{e}_k(n)$ has the lowest value of all $\overline{e}_m(n)$ $\gamma 2$ is a parameter for smoothing, and it is between 0 and 1. $\eta_3$ is a threshold parameter (such as 0.001, 0.01, 0.1, 1 etc.).

Candidate Feedback Path Update

The candidate feedback paths $\underline{h}_m$ can be measured, for each hearing aid user, during a fitting session, and/or updated during the normal operation after the fitting session.

An easy way to obtain these candidate feedback paths is to measure them during the fitting session. This can be done by having the hearing aid user to, e.g., hold a phone to his/her ear, to wear a hat, to stand close (10-15 cm) to a hard-surface wall while measuring the feedback path using the built-in feedback cancellation system in the hearing aid (e.g., the Feedback Path Analyzer, cf. e.g. FIG. 3). This method would provide candidate feedback paths which are "pre-determined" and cannot be changed online.

Another way of updating the database can be done by the hearing aid user to carry out measurements, in different acoustic situations, using an APP connected to the hearing aid, cf. FIG. 4, below. This method also provides "pre-determined" candidate feedback paths, which can be changed online, though.

A more sophisticated way of updating these candidate feedback paths $\underline{h}_m$ during the hearing aid operation can be carried out by monitoring the current feedback path estimates $\underline{h}^*(n)$, especially when/after the hearing aid gets unstable due to feedback problems, and/or if the hearing aid itself can detect a change of the acoustic situations (phone-to-ear, hard-surface, hat/helmet etc.), maybe based on external device inputs (e.g., a camera). This method 'learns' online.

More specifically, if the hearing aid system gets unstable due to feedback problems, and the existing feedback cancellation system re-establishes system stability after the adaptive filter $\underline{h}^*(n)$ has converged to the new feedback path, the current values of $\underline{h}^*(n)$ can be a good candidate feedback path to be included to the database.

This is especially the case, if similar $\underline{h}^*(n)$'s have been obtained after several feedback occurrences, where the system initially was unstable before the adaptive filter $\underline{h}^*(n)$ managed to re-stabilize the system. In FIG. 1, there is an optional connection (denoted 'System Info (Optional)') from the processing block ('Processing') to the control unit ('Control Unit') to facilitate this system stability detection and the candidate feedback path update.

A Simulation Example

In the following, an example with M=2 feedback paths in the database (cf. Feedback Path Database ($\underline{h}_1, \underline{h}_2, \ldots, \underline{h}_m$) in FIG. 1) is discussed.

First, two external feedback paths of ($\underline{h}_1(n)$, $\underline{h}_2(n)$) have been measured, one without and one with a phone placed next to a model (e.g. KEMAR) ear, respectively. These two measurements of $\underline{h}(n)$ are then used as the candidate feedback paths $\underline{h}_1$ and $\underline{h}_2$ in the database.

Next, in a simulation experiment, $\underline{h}_1$ and $\underline{h}_2$ has been used to compute error signals $e_1 n)$ and $e_2(n)$, based on the hearing aid output signal u(n) and the microphone signal y(n) (cf. e.g. FIG. 1). Furthermore, in the beginning of the simulation, the external acoustic feedback path $\underline{h}(n)$ is chosen to be the model (e.g. KEMAR) measurement without a phone placed next to the ear. After 0.5 second, the external acoustic feedback path $\underline{h}(n)$ is chosen to be that of the other model (e.g. KEMAR) measurement with a phone placed next to the ear.

Figure 2:
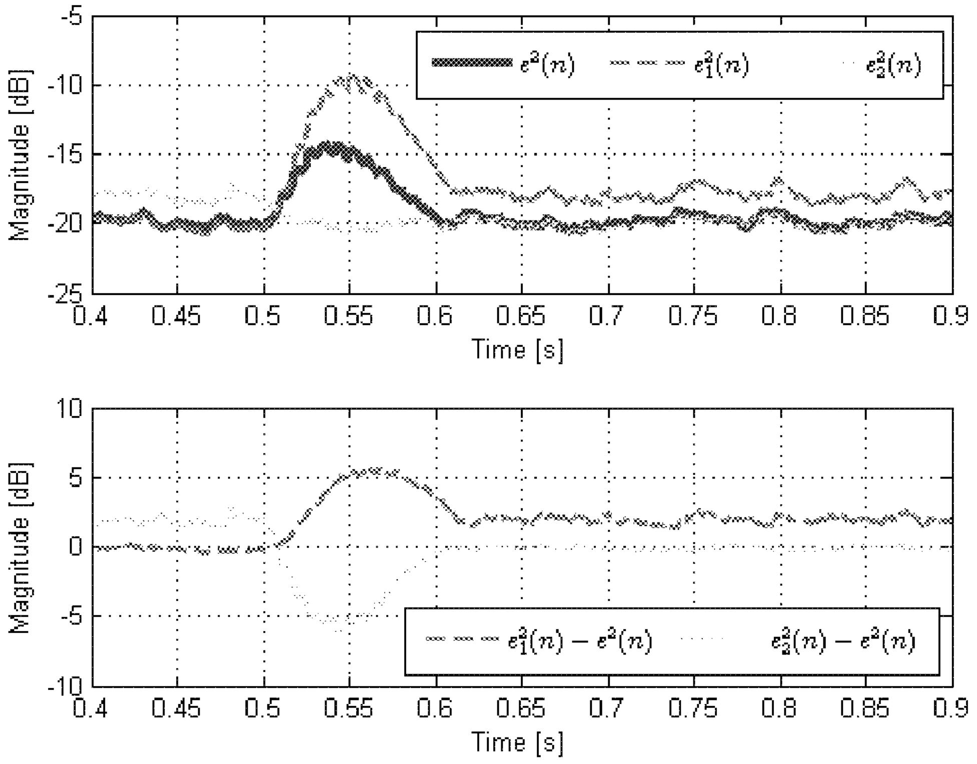
FIG. 2 illustrates a simulation example showing the development of the smoothed magnitude of the current error signal e(n), and the magnitude of respective database error signals $e_1(n)$ and $e_2(n)$, before and after a feedback path change at 0.5 second.

FIG. 2 shows a simulation example showing the development of the smoothed magnitude of the current error signal e(n), and the magnitude of respective database error signals $e_1(n)$ and $e_2(n)$, before and after a feedback path change at 0.5 second. In FIG. 2, the smoothed magnitude square values of the current error signal e(n) and the candidate error signals $e_1(n)$ and $e_2(n)$, over time, reveal if the current adaptive filter $\underline{h}^*(n)$ is performing well (close to one of the candidate feedback paths), and/or if an updated value $\underline{h}_{upd}(n)$ based on $\underline{h}_1$ and/or $\underline{h}_2$ can be beneficial at a given time instant. Instead of magnitude square values, absolute values or other norms can also be used.

Before the feedback path change at t=0.5 second, it can be observed in the plot at the top part of FIG. 2 that the smoothed magnitude square values of e(n) and $e_1(n)$ are very close to each other, where $e_2(n)$ has a bigger magnitude square value, correctly indicating that the current acoustic situation is close to the candidate feedback path $\underline{h}_1$ and far away from $\underline{h}_2$. Similarly, the opposite is the case at the end of the simulation (near t=0.9 second).

More interestingly, it can be observed in the plot at the top part of FIG. 2 that right after the feedback path change at t=0.5 second, the magnitude square values of e(n) and $e_1(n)$ start to increase, because both the current adaptive filter estimate $\underline{h}^*(n)$ as well as the candidate feedback path $\underline{h}_1$ model the true feedback path $\underline{h}(n)$ poorly right after the change. As the adaptive filter estimate $\underline{h}^*(n)$ converges to the new feedback path $\underline{h}(n)$, the magnitude square value of e(n) decreases, and it is eventually (at approximately t=0.6 s) very close to the magnitude square value of the error signal $e_2(n)$ computed based on the candidate feedback path $\underline{h}_2$, which is a good match to the new acoustic situation (phone placed next to the model (e.g. KEMAR) ear).

As observed in the plot at the top part of FIG. 2, the magnitude square value of the error signal $e_2(n)$, on the other hand, was initially large compared to the magnitude square value of e(n), however, it made a significant drop, right after the feedback path change after t=0.5 second, indicating that the candidate feedback path $\underline{h}_2$ provides now a much better model of the feedback path compared to the current adaptive filter estimate $\underline{h}^*(n)$ and the candidate feedback path $\underline{h}_1$.

Finally, it can be concluded that it would be beneficial to use the update feedback path $\underline{h}_{upd}(n)=\underline{h}_2$ to modify $\underline{h}^*(n)$ in this situation (right after the feedback path change at t=0.5 s). This is illustrated by the bottom part of FIG. 2 where $e_1^2(n)-e^2(n)$ (----) and $e_2^2(n)-e^2(n)$ ( . . . ) are plotted versus time [s]. It is clear from the graphs that up to t=0.5 second, $e_1^2(n)-e^2(n)$ is lower than $e_2^2(n)-e^2(n)$ indicating that $\underline{h}_1$ is the better candidate feedback path and after t=0.5 second $e_2^2(n)-e^2(n)$ is lower than $e_1^2(n)-e^2(n)$ indicating that $\underline{h}_2$ is the better candidate feedback path.

All the above explanations, in connection to this simulation experiment, may be implemented in the control unit. The decisions of applying $\underline{h}_{upd}(n)$ can be based on logical operations, by simply comparing the magnitude square values of e(n), $e_1(n)$ and $e_2(n)$, or processed versions of e(n), $e_1(n)$ and $e_2(n)$, etc., or it can be more sophisticated AI based classifications. The AI based classification can be done as a machine learning algorithm, which has been trained with the known candidate feedback paths $\underline{h}_m$ from measurements, and/or the candidate error signals $e_m(n)$, the current feedback path estimate $\underline{h}^*(n)$ and error signal e(n), and the exact timings of feedback path changes in computer simulations.

Exemplary Use Cases

In the following, a few embodiments of the feedback control scheme according to the present disclosure are described.

1. Band-pass, low-pass, and/or high-pass filtering of error signals e(n) and $e_m(n)$, before being used for comparisons. An example of band-pass filtering has a pass-band between 2 kHz and 4 kHz, where the feedback is mostly likely to occur.
2. Besides/in addition to a modification of the adaptive filter estimate $\underline{h}^*(n)$ by the candidate feedback path ($\underline{h}_{upd}(n)$), the control unit may be configured to control the adaptive filter estimate $\underline{h}^*(n)$, e.g., by increasing or decreasing the step size in the adaptive algorithm, e.g., by a factor of 1.1, 1.5, 2, 3, 4, 5, 8, 10, 16, 32 . . . .
3. The entire process of controlling the adaptive filter estimate based on a candidate feedback path may be made dependent on a one or more conditions, e.g. the level of input signals (e.g. required to be in a certain range), the type of input signals (e.g., speech, music, background noise etc.).
4. One of the candidate feedback paths can be the "most likely" feedback path during normal hearing aid operation, determined by prior knowledge, e.g. determined by a long-term averaging of current feedback path estimates, and that value may be used as a reference for the comparison. If the current feedback estimate differs (significantly and quickly) from the reference, it indicates a major change.
5. More details on how to update the candidate feedback paths in the database during the hearing aid operation: A control mechanism may be configured to monitor the current feedback path estimate $\underline{h}^*(n)$, and to apply machine learning algorithms, such as unsupervised learning (for clustering) and reinforcement learning to identify and improve the candidate feedback paths (cf. e.g. FIG. 6).
6. The length of the impulse response of candidate feedback paths may be different (longer or shorter) than the current adaptive filter length for better modelling of desired acoustic situations or for reducing the computations needed to compute the candidate error signals. Such a candidate feedback path with long or short impulse response may not be directly used to replace the current feedback path estimate $\underline{h}^*(n)$, but a truncated version or an extended version (with zeros) may be used, and/or it can be used to control the step size in the adaptive algorithm.

Figure 3:
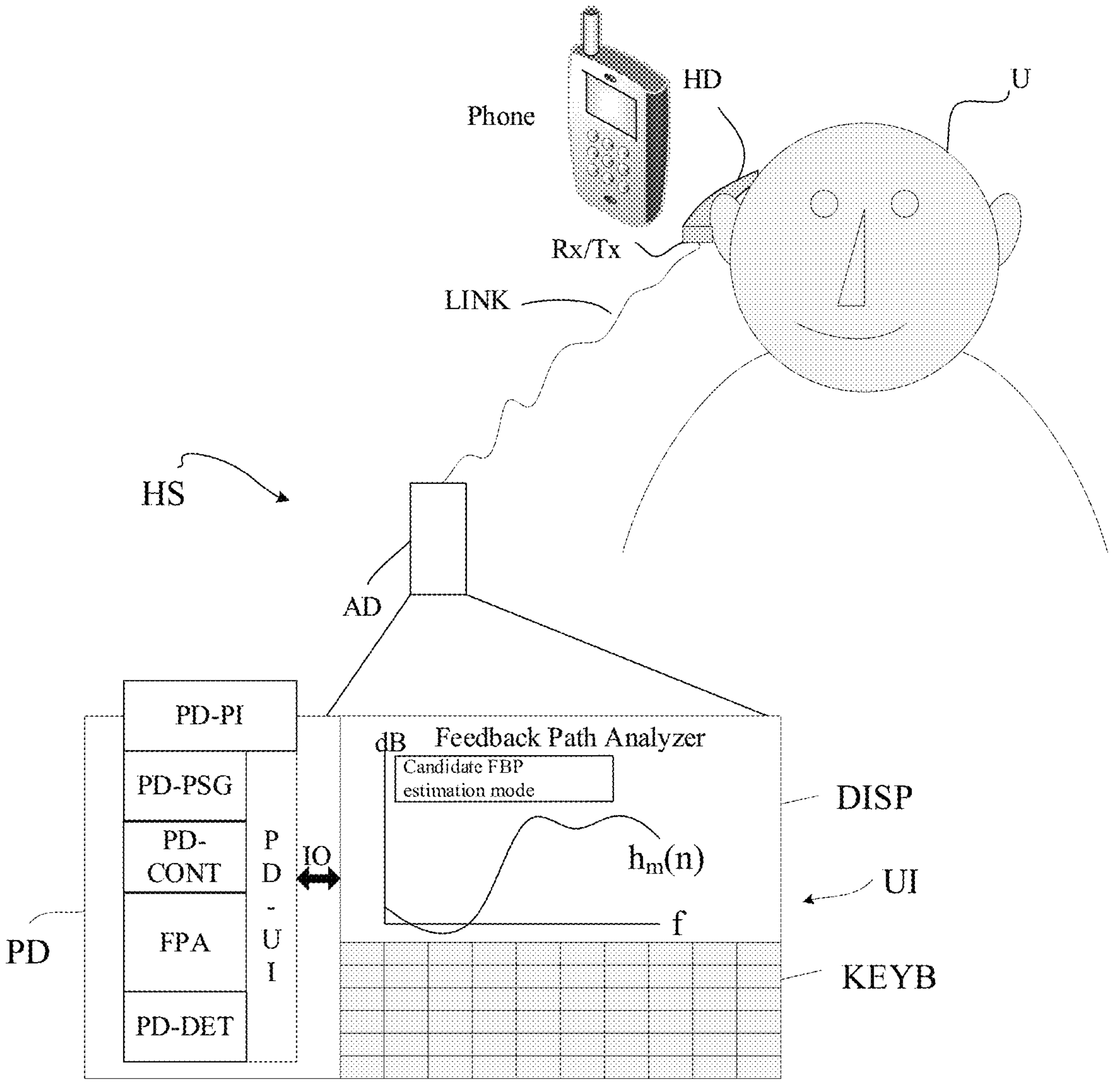
FIG. 3 shows a block diagram of an exemplary system comprising hearing aid according to the present disclosure and a feedback analyser connected to the hearing aid.

FIG. 3 shows a block diagram of an exemplary system comprising hearing device (HD) configured to be worn at an ear of a user (U) according to the present disclosure and a feedback analyser (FBA) connected to the hearing aid. FIG. 3 shows an embodiment of a hearing system (HS) comprising a hearing device (HD) and a programming device (PD) according to the present disclosure. The hearing device comprises a feedback estimation unit (FBE) for providing an estimate v*(n) of a current feedback v(n) (cf. FIG. 1) from an output transducer (here a loudspeaker SPK, cf. FIG. 1) to an input transducer (here a microphone M, cf. FIG. 1) of the hearing device (HD).

The hearing device (HD) of FIG. 3 comprises hearing device programming interface and transceiver circuitry (Rx/Tx) allowing a communication link (LINK) to be established between the hearing device and the programming device (PD). The communication link (LINK) may be a wired or wireless (e.g. digital) link. The hearing device (HD) of FIG. 3 further comprises on-board feedback estimation unit ('Feedback Cancellation System $\underline{h}^*(n)$' in FIG. 1) for estimating a feedback from the output of the processor ('Processing' in FIG. 1) (signal u(n)) to the output of the combination unit ('+' in FIG. 1) (signal e(n) in FIG. 1). The on-board feedback estimation unit comprise a variable filter part for filtering the output signal (u(n) in FIG. 1) and providing an estimate of the feedback path signal ($v^*(n)=\underline{h}^*(n)^T \cdot u(n)$ in FIG. 1). e.g. under normal operation of the hearing device (where the programming device (PD) is NOT connected to the hearing device (HD)), or in a fitting procedure. The filter coefficients of the variable filter part of the adaptive filter are determined by an adaptive algorithm by minimizing the feedback corrected input signal (signal e(n)) considering the current output signal u(n). The hearing device (HD) of FIG. 3 may further comprises an on-board probe signal generator (PSG) for generating a probe signal. e.g. for use in connection with feedback estimation, either performed by the on-board feedback estimation unit or the feedback path analyzer (FPA) of the programming device (PD), or both.

The hearing device (HD) of FIG. 3 may further comprise a selection unit operationally connected to the output of the on-board probe signal generator of the hearing device (HD) and to a probe signal (optionally) received from the programming device (PD) via the communication link (LINK). The programming device (PD) may provide a probe signal from the probe signal generator (PD-PSG) of the programming device (PD) via a programming device programming interface (PD-PI). The resulting probe signal in the hearing device (output of selection unit) at a given time (n) is controllable from the programming device (PD) via the programming interface. Various functional units (e.g. the processor, the selection unit, on-board probe signal generator, the feedback estimation unit, and the combination unit(s) ('+)) of the hearing device (HD) may be controllable from the user interface (UI) of the programming device (PD) via control signals exchanged via the respective programming interfaces and the communication link (LINK). Likewise, signals of interest in the hearing device (e.g. signals y(n), e(n), u(n) and feedback estimate v*(n) of the on-board feedback estimation unit) may be made available in the programming device (PD) via the programming interfaces. The latter can e.g. be used as a comparison for the feedback path estimate(s) made by the feedback path analyzer (FPA) of the programming device (PD), e.g. to increase validity of a feedback risk indicator. Such improved feedback path measurement may e.g. be used in determining a maximum allowable gain (e.g. dependent on frequency bands) in a given acoustic situation, cf. e.g. WO2008151970A1, or as a candidate feedback path ($\underline{h}_m$) for a particular acoustic situation for storage in memory of the hearing aid (cf. Feedback Path Database ($\underline{h}_1$, $\underline{h}_2$, . . . , $\underline{h}_m$) in FIG. 1).

The programming device (PD) may be configured to execute a fitting software for configuring a hearing device in particular the hearing device processor but also to provide the candidate feedback paths ($\underline{h}_m$) according to the present disclosure. The feedback path analyzer (FPA) and other functionality of the programming device (PD) may be implemented by the fitting software.

The user interface (UI) of the programming device (PD) may (as indicated in FIG. 3) be implemented in an (e.g. portable, e.g. hand-held) auxiliary device (AD), e.g. a separate processing device, e.g. a smart phone (e.g. in connection with an APP, e.g. an APP for controlling the hearing device). The programming device (PD) itself may be implemented in (e.g. be constituted by or form part of) an (e.g. portable, e.g. hand-held) auxiliary device (AD), e.g. a separate processing device, e.g. a smart phone, cf. e.g. FIG. 4.

The estimate of the feedback path (Feedback Path $\underline{h}$(n)' in FIG. 1)) may be determined in the hearing device (HD). The feedback path estimation may (alternatively or additionally) performed in the programming device (PD). This is indicated in FIG. 3 by the shadowed outline of the feedback path analyzer unit (FPA) in the display part (DISP) of the user interface (UI) of the programming device (PD). With the data access directly in a programming device/computer, we can estimate the feedback path using different methods (either one of them or all of them), and this can (potentially) be done more quickly and/or precisely than in the hearing device, because the programming device does not have the limitations in space and power consumption (and thus processing capacity) of the hearing device (e.g. a hearing aid).

The programming device (PD) of FIG. 3 further comprises a detector unit (PD-DET) comprising one or more detectors, e.g. a correlation detector or a noise level detector, or a feedback detector, etc., for providing an indicator of one or more parameters of relevance for controlling the feedback path analyzer unit (FPA), e.g. a choice of feedback estimation algorithm and/or whether a value of the feedback risk indicator fulfils a high fredback-risk criterion. The interface (IO) to the user interface (UI) (comprising display (DISP) and keyboard (KEYB)) allowing exchange of data and commands between the fitting system user and the programming device is indicated by double (bold) arrow (denoted IO, and physically implemented by the programming device user interface (PD-UI)).

The exemplary display (DISP) screen of the programming device of FIG. 3 shows a situation where a user (e.g. an audiologist or the user himself) is in a candidate feedback path estimation mode ('Candidate FBP estimation mode' in FIG. 3), where the user mimics a specific commonly occurring acoustic situation (e.g. a normal situation without severe feedback, or one or more situations where a large amount of feedback is expected, e.g. being close to a hard surface e.g. a wall). Here a 'phone to the ear' feedback situation is mimicked (cf. 'Phone' in FIG. 3 placed close to the right ear of the user (U) where the hearing device (HD) is located). A corresponding candidate feedback path $h_m$ as proposed by the present disclosure is estimated by the feedback path analyzer (FPA) and visualized (magnitude (dB) vs. frequency (f)) in the display part (DISP) of the user interface (UI) of the programming device (PD).

Figure 4:
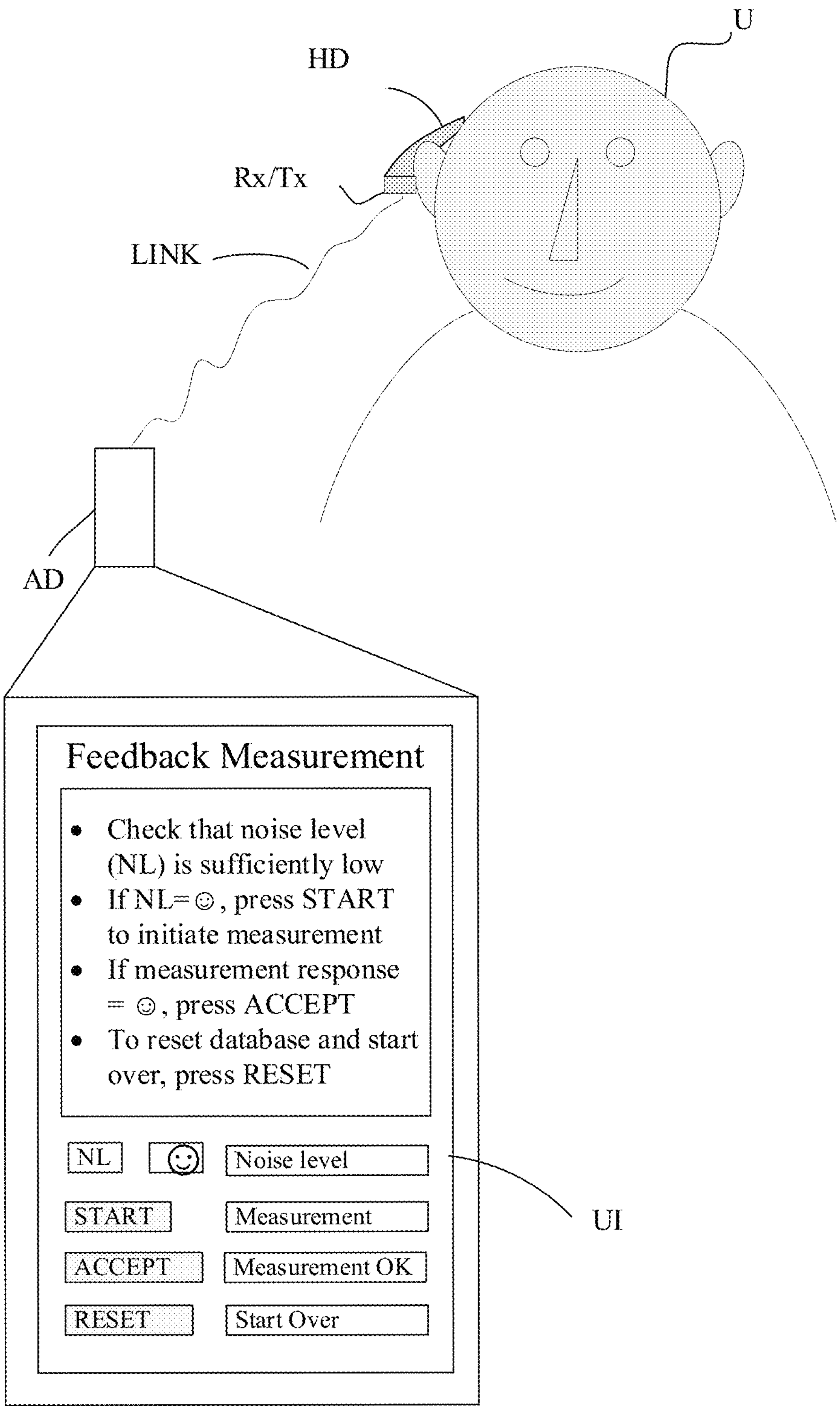
FIG. 4 shows a hearing aid according to the present disclosure worn by a user and an APP (implemented on an auxiliary device) for controlling the feedback control system of the hearing aid.

FIG. 4 shows a hearing device, e.g. a hearing aid, according to the present disclosure worn by a user and an APP (implemented on an auxiliary device) for controlling the feedback control system of the hearing device.

FIG. 4 shows a block diagram for a hearing system (HS) comprising a hearing device (HD), e.g. a hearing aid, and an APP (cf. screen 'Feedback Measurement' in FIG. 4) running on an auxiliary device (AD), e.g. a smartphone, and configured as a user interface (UI) for the hearing device user (U) allowing a measurement session to provide (or update) candidate feedback paths for use in a feedback control system according to the present disclosure to be carried out by the user or 'automatically' by the system guiding the user. The hearing system is configured to establish a link (LINK) between the auxiliary device (AD) and the hearing device (HD) via appropriate antenna and transceiver circuitry in the devices (cf. Rx/Tx in the hearing device (HD)). The link may e.g. be based on Bluetooth (or Bluetooth Low Energy, e.g. Bluetooth LE Audio), or proprietary modifications thereof, or Ultra WideBand (UWB), or other standardized or proprietary wireless communication technologies.

The APP may be generally adapted to control functionality of the hearing device or system, or it may be dedicated to control or influence the feedback control system according to the present disclosure, including to manage measurement (and/or selection for use) of appropriate candidate feedback paths ($\underline{h}_m$) for storage in memory of the hearing device. FIG. 4 shows a screen of the 'Feedback Measurement' APP, where the top part of the screen contains instructions to the user regarding the measurement session:

Check that noise level (NL) is sufficiently low.

If NL-☺, press START to initiate measurement.

If measurement response=☺, press ACCEPT.

To reset database and start over, press RESET.

In the lower part of the screen of the exemplified 'Feedback Measurement' APP, a number of information/action fields ('activation buttons') are located allowing a user to

- monitor a noise level in the environment (press 'NL' to get an updated estimate of the Noise level),
- initiate measurement session (press 'START', in case the noise level is acceptable, ☺),
- accept the result of the measurement when information has been received that the measurement has been successfully concluded (press 'Accept', if measurement is OK (or 'Reject' if measurement is not OK)).
- reset database (or the last entry of the database) (press RESET).

Thereby a measurement of a candidate feedback path (e.g. 'telephone close to ear equipped with hearing device') can be provided. The System (e.g. the APP) may be configured to transmit an accepted candidate top the hearing aid memory via the communication link (LINK).

The APP my e.g. be further adapted to allow the user to activate, or deactivate, one or more predefined candidate feedback paths stored in the memory of the hearing aid.

Other parts of the hearing device may be controlled via other screens of the APP. Further, a configuration of the feedback control system may be performed vi the APP (e.g. to activate or deactivate the feedback control system according to the present disclosure in a given hearing device program).

The hearing system may comprise one or two hearing devices, e.g. first and second hearing devices located at left and right ears, e.g. first and second hearing aids of a binaural hearing aid system (or first and second ear pieces of a headset). The hearing system may e.g. comprise two ear pieces and a processing device for serving the two ear pieces. The processing device may be configured to execute the APP.

Figure 5:
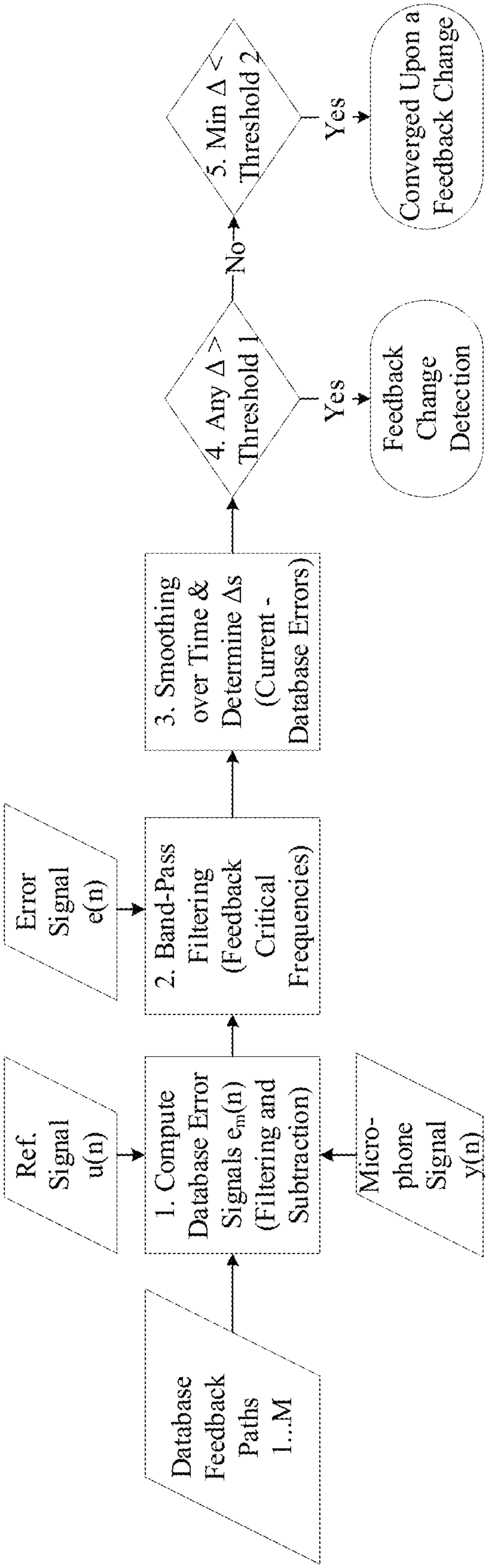
FIG. 5 shows an exemplary flow diagram of a method of estimating a current feedback path of a hearing aid according to the present disclosure.

FIG. 5 shows an exemplary flow diagram of a method of estimating a current feedback path of a hearing device, e.g. a hearing aid, according to the present disclosure. It may e.g. represent a flow chart of an exemplary control unit, cf. e.g. block 'Control Unit (Logic and/or AI based)' in FIG. 1. The first step (in the left part of the flow-diagram, denoted '1. Compute Database Error Signals $e_m(n)$ (Filtering and Subtraction)') is to compute the database error signals $e_m(n)$ based on the candidate feedback paths $\underline{h}_m$, the signals u(n) and y(n) (cf. data inputs to step 1 denoted 'Database Feedback Paths 1 . . . M'. Ref. Signal u(n)' and 'Microphone Signal y(n)', respectively). The second step (denoted '2. Band-Pass filtering (Feedback Critical Frequencies)') is a bandpass filtering of the current error signal e(n) (cf. data input to step 2 denoted 'Error signal e(n)') and the candidate error signals $e_m(n)$. The goal of the bandpass filtering is to focus on the most feedback critical frequency region, typically between 2 kHz and 4 kHz. The third step (denoted '3. Smoothing over Time & Determine Δs (Current Database Errors)') is to smooth the magnitude square values of e(n) and $e_m(n)$ over time, and to compute the differences. In the step four (denoted '4. Any Δ>Threshold 1'), if any difference is bigger than a threshold value ('Threshold 1'), such as 1 dB. 2 dB. 3 dB etc., it indicates that a candidate feedback path $\underline{h}_m$ provides a smaller error than the current feedback path estimate $\underline{h}^*(n)$, hence, it indicates a feedback path change (cf. arrow 'Yes' to the stop indicator denoted 'Feedback Change Detection'). If differences Δ are smaller than the threshold ('Threshold 1'), arrow denoted 'No' is followed to step five. Finally, in step five (denoted '5. Min Δ<Threshold 2'), if the difference is smaller than another threshold value, such as 0.1 dB. 0.2 dB. 0.3 dB etc., it indicates that the current feedback path estimate $\underline{h}^*(n)$ has converged, upon a feedback path change, to a candidate feedback path $\underline{h}_m$ (cf. arrow 'Yes' to the stop indicator denoted 'Converged Upon a Feedback Change'). Otherwise, the feedback path estimate $\underline{h}^*(n)$ is still converging, upon a feedback path change, to a candidate feedback path $\underline{h}_m$. The indications of feedback path change detection and the convergence of the adaptive filter can be used to control the adaptive filter $\underline{h}^*(n)$. e.g. by altering its adaptation speed in between the feedback path change detection and its convergence.

Figure 6:
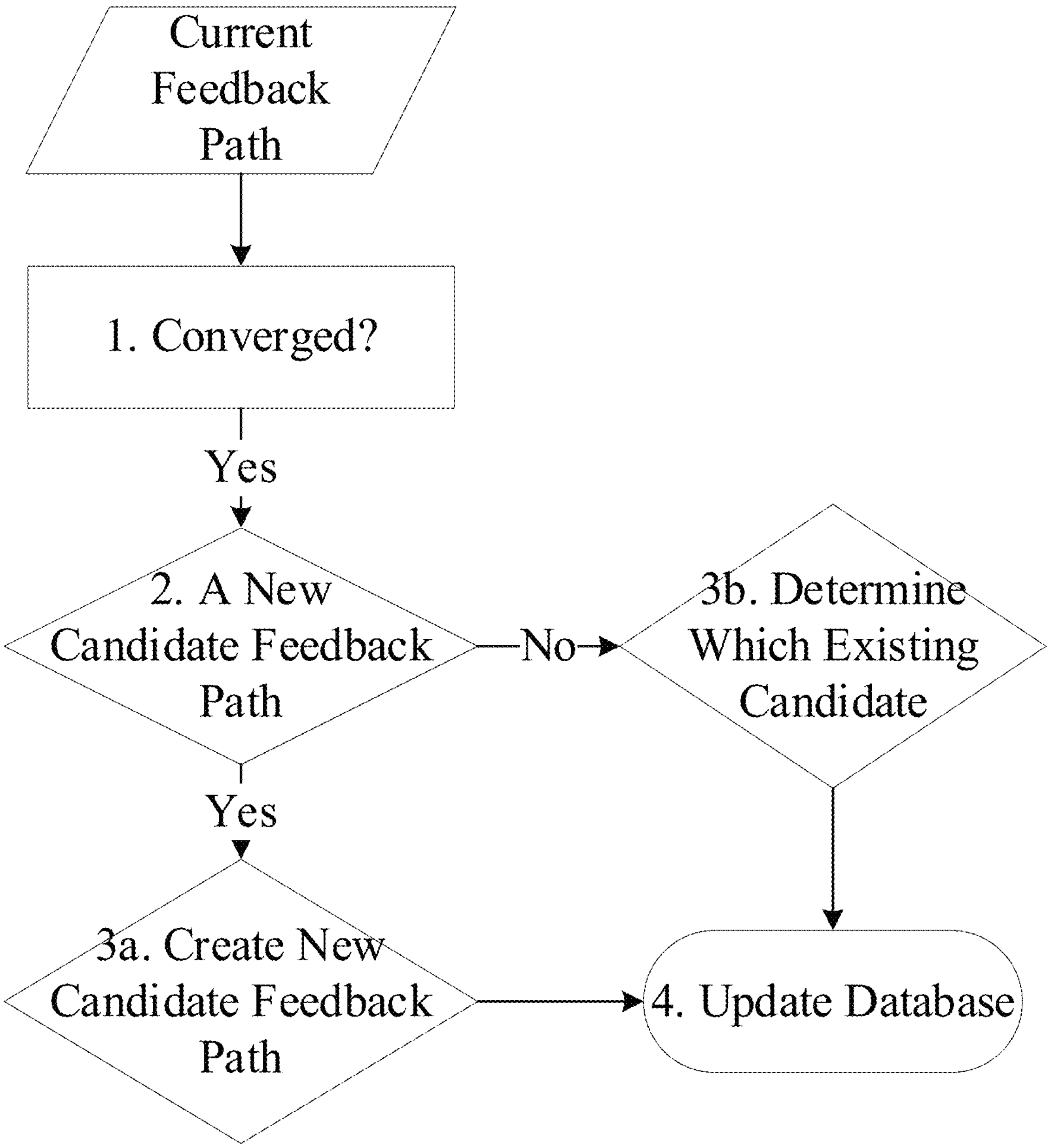
FIG. 6 shows an exemplary flow diagram of a method of updating feedback paths in a database of candidate feedback paths according to the present disclosure.

FIG. 6 shows an exemplary flow diagram of a method of updating feedback paths in a database of candidate feedback paths according to the present disclosure. FIG. 6 shows an example flow chart of building a database containing candidate feedback paths. In step 1 (denoted '1. Converged?'), the current feedback path estimate $\underline{h}^*(n)$ is compared to $h^*(n-1)$ (cf. data input denoted 'Current Feedback Path'), a scalar value of the difference is computed as the sum of squared value of each element in the resulting vector $\underline{h}^*(n)-h^*(n-1)$. If the scalar value is smaller than a first threshold, e.g., −30 dB, −40 dB, −50 dB, −60 dB etc., the current feedback path estimate $\underline{h}^*(n)$ is considered to be converged. Otherwise, it is still converging, or it exhibits an unexpected steady-state behavior. In step 2 (denoted '2 New Candidate Feedback Path'), a difference value $\Delta_m$ as sum of squared values of each element in the resulting vector $\underline{h}^*(n)-\underline{h}_m$ is computed. If any $\Delta_m$ exceeds a second threshold value, e.g., 0.01, 0.05, 0.1, 0.5, 1, 2, etc., it indicates a new candidate feedback path $\underline{h}_{m+1}$ should be created, as is done in step 3a (cf. arrow 'Yes' leading to step 3a): otherwise (cf. arrow 'No' leading to step 3b), it indicates that the current feedback path is similar to an existing candidate feedback path in the database, and the smallest value of $\Delta_m$ indicates which of these candidate feedback paths the current feedback path estimate belongs to. In step 4 (denoted '4. Update Database'), the current feedback path estimation $\underline{h}^*(n)$ is then used to update or improve the corresponding (new or existing) candidate feedback path. The arrow from step 3b to step 4, represents the case where we have an existing candidate $\underline{h}_m$ which is similar to the current feedback path estimate $\underline{h}^*(n)$. In this case, we may use $\underline{h}^*(n)$ to improve the existing candidate $\underline{h}_m$, e.g. by a weighted averaging.

Embodiments of the disclosure may e.g. be useful in applications such as hearing aids, e.g. binaural hearing aid systems or headsets, or speakerphones, or combinations thereof.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] B. Rafaely, M. Roccasalva-Firenze, and E. Payne, "Feedback path variability modeling for robust hearing aids," J. Acoust. Soc. Am., vol. 107, no. 5, pp. 2665-2673, May 2000.

[2] T. Sankowsky-Rothe and M. Blau, "Static and dynamic measurements of the acoustic feedback path of hearing aids on human subjects," in Proceedings of Meetings on Acoustics, vol. 30, October 2017, pp. 1-7.

The invention claimed is:

1. A hearing aid adapted for being worn by a user at or in an ear of the user, the hearing aid comprising at least one input transducer for converting sound in an environment around the user to at least one electric input signal representing said sound;

an output transducer for converting a processed output signal provided in dependence of said at least one electric input signal to stimuli perceivable to the user as sound;

a feedback control system comprising an adaptive filer, the feedback control system being configured to provide an adaptively determined estimate ($\underline{h}^*(n)$) of a current feedback path ($\underline{h}(n)$) from said output transducer to said at least one input transducer in dependence of said at least one electric input signal, said processed output signal, and an adaptive algorithm; and a database comprising a multitude (M) of previously determined candidate feedback paths ($\underline{h}_m$); and a controller configured to identify a change in the current feedback path ($\underline{h}(n)$) based on the adaptively determined estimate ($\underline{h}^*(n)$) of the current feedback path and at least one of said multitude of previously determined candidate feedback paths ($\underline{h}_m$).

2. A hearing aid according to claim 1 wherein the controller is configured to—if a change in the current feedback path ($\underline{h}(n)$) has been identified—determine whether the adaptively determined estimate ($\underline{h}^*(n)$) of the current feedback path converges towards at least one of said multitude of previously determined candidate feedback paths ($\underline{h}_m$).

3. A hearing aid according to claim 2 wherein said controller is configured to provide an updated estimate of said current feedback path ($\underline{h}_{upd}(n)$) if said change in the current feedback path ($\underline{h}(n)$) has been identified and if said adaptively determined estimate ($\underline{h}^*(n)$) of the current feedback path converges towards at least one of said multitude of previously determined candidate feedback paths ($\underline{h}_m$).

4. A hearing aid according to claim 3 wherein the controller is configured to provide said updated estimate of said current feedback path ($\underline{h}_{upd}(n)$) in dependence of said adaptively determined estimate of said current feedback path ($\underline{h}^*(n)$) and at least one of said multitude of previously determined candidate feedback paths ($\underline{h}_m$).

5. A hearing aid according to claim 3 wherein the controller is configured to provide said updated estimate of said current feedback path ($\underline{h}_{upd}(n)$) as a linear combination of said adaptively determined estimate of a current feedback path ($\underline{h}^*(n)$) and said at least one of said multitude of previously determined candidate feedback paths ($\underline{h}_m$).

6. A hearing aid according claim 5 wherein the feedback control system is configured to provide a current feedback corrected version of said at least one electric input signal, termed the current feedback corrected signal ($e(n)$), the controller is configured to provide a candidate current feedback corrected signal ($e_m(n)$) for said at least one of said previously determined candidate feedback paths ($\underline{h}_m$), and weights of said linear combination are determined in dependence of a comparison of said candidate current feedback corrected signal ($e_m(n)$) to the current feedback corrected signal ($e(n)$).

7. A hearing aid according to claim 6 configured to band-pass, low-pass, and/or high-pass filter said feedback corrected input signals ($e(n)$, $e_m(n)$) before said comparison of said candidate current feedback corrected signal ($e_m(n)$) to the current feedback corrected signal ($e(n)$) is performed.

8. A hearing aid according to claim 5 wherein weights of said linear combination are determined in dependence a direct comparison of $\underline{h}^*(n)$ and $\underline{h}_m$.

9. A hearing aid according to claim 3 wherein the feedback control system is configured to provide a current feedback corrected version of said at least one electric input signal, termed the current feedback corrected signal ($e(n)$), and the feedback control system, at least in a specific feedback control mode of operation, is configured to provide said current feedback corrected version ($e(n)$) of the at least one electric input signal in dependence of said updated estimate of said current feedback path ($\underline{h}_{upd}(n)$).

10. A hearing aid according to claim 1 comprising an audio signal processor configured to apply one or more processing algorithms to said feedback corrected version of said at least one electric input signal, and to provide said processed signal in dependence thereof.

11. A hearing aid according to claim 1 wherein the feedback control system is configured to provide a current feedback corrected version of said at least one electric input signal, termed the current feedback corrected signal ($e(n)$).

12. A hearing aid according to claim 1 wherein the controller is configured to provide a candidate current feedback corrected signal ($e_m(n)$) for said at least one of said previously determined candidate feedback paths ($\underline{h}_m$).

13. A hearing aid according to claim 1 wherein the controller is configured to control an adaptation rate of the adaptively determined estimate ($\underline{h}^*(n)$).

14. A hearing aid according to claim 1 wherein one of the candidate feedback paths ($\underline{h}_m$) of the database is estimated to be the most likely feedback path during normal hearing aid operation.

15. A hearing aid according to claim 1 wherein said candidate feedback paths of the database comprise or are constituted by pre-determined feedback paths.

16. A hearing aid according to claim 1 configured to update said candidate feedback paths of the database during operation of the hearing aid.

17. A hearing aid according to claim 16 configured to provide that said candidate feedback paths of the database are automatically learned and updated over time.

18. A hearing aid according to claim 17 wherein the learning and update of the candidate feedback paths of the database is configured to follow the variations of the current feedback path $\underline{h}(n)$ and its previous values over time.

19. A hearing aid according to claim 1 wherein a length of an impulse response of a candidate feedback path of the database are different, e.g. longer or shorter, from a length of the adaptive filter of the hearing aid used for adaptively determining the estimate ($\underline{h}$*(n)) of the current feedback path.

20. A hearing aid according to claim 1 being constituted by or comprising an air-conduction type hearing aid, a bone-conduction type hearing aid, a cochlear implant type hearing aid, or a combination thereof.

* * * * *